United States Patent Office

2,811,417
Patented Oct. 29, 1957

2,811,417

SODIUM HYPOCHLORITE PRODUCTION BY CATION EXCHANGE MATERIALS

John George Matarese, Evanston, and John Kenneth Moorhead, Wilmette, Ill., assignors to Olin Mathieson Chemical Corporation, a corporation of Virginia No Drawing. Application November 9, 1950, Serial No. 194,946

4 Claims. (Cl. 23—86)

This invention relates to the conversion of calcium hypochlorite in dilute aqueous solution to sodium hypochlorite in dilute aqueous solution and more particularly to a process for effecting this conversion which comprises passing the calcium hypochlorite solution through a bed composed of a stable cation exchange material charged with sodium ions.

In the prior art of manufacturing sodium hypochlorite solutions from calcium hypochlorite, it is usual to dissolve the calcium hypochlorite in water and add sodium carbonate thereto. Calcium carbonate is precipitated and sodium hypochlorite remains in solution. The mixture may be settled, filtered or otherwise separated to obtain a clear solution of sodium hypochlorite. These operations are essential and are tolerated because of the advantages of sodium hypochlorite over calcium hypochlorite in many applications, inter alia, the absence of ions in sodium hypochlorite solutions which form precipitates with soaps. Because sodium hypochlorite cannot be obtained in stable form either as a concentrated solution or as a solid, it is necessary, in order to avoid the use of liquid or gaseous chlorine, to use the more stable solid calcium hypochlorite for storing and shipping available chlorine and to convert it later into the more advantageous sodium hypochlorite.

The present invention provides improved and novel means for effecting the conversion of calcium hypochlorite to sodium hypochlorite which requires less equipment and fewer operations. Furthermore, the operations are more satisfactorily carried out with unskilled hands, and an economical source of hypochlorite solution of uniform strength is safely and conveniently afforded.

According to the present invention, calcium hypochlorite is dissolved in water and passed through a bed of a suitable ion exchange material whereby the calcium ions are adsorbed by the material and sodium ions with which the material was originally charged substituted in the solution. Despite the known oxidizing and chemical activity of hypochlorite solutions, particularly with organic materials, we have found that calcium hypochlorite in solution can be converted to sodium hypochlorite in solution by ion exchange if the concentration of available chlorine in the calcium hypochlorite solution is limited to less than about 5% by weight, advantageously 1 to 3% by weight. We also have found that the cation exchange material area per gallon required to effect the conversion is very reasonable so that a surprisingly simple source of stable sodium hypochlorite solutions is made available to users of dilute hypochlorite.

Since hypochlorite is a very powerful oxidizing agent, not all cation exchange materials are suitable for the purpose of this invention. For instance urea formaldehyde and melamine are readily oxidized and their ion exchange qualities consequently destroyed. Cation exchange materials suitable for the purpose may be inorganic or organic in nature so long as they are stable to hypochlorite solutions. Zeolites treated with and regenerated with sodium chloride brine are useful. Of the organic cation exchange materials, we have found the sulfonated aromatic hydrocarbon resins to be stable to hypochlorite solutions and effective in exchanging sodium for calcium ions.

Eventually the cation exchange materials become saturated or spent, and the bed may be regenerated by washing with water and then with a 15% by weight solution of sodium chloride. The preparation of sodium hypochlorite solutions, according to this method, may be made continuous by passing the calcium hypochlorite solution through the cation exchanger bed until it has become saturated with calcium ions, switching the operation to a fresh bed of cation exchange material, and in the meantime regenerating the first bed of cation exchange material.

The following specific examples indicate how the process of this invention may be practiced and the novel manner in which sodium hypochlorite in solution may be prepared. The examples are for purposes of illustration and are not to be construed as limiting the scope of the invention.

*Example I*

A calcium hypochlorite solution containing 1% by weight of available chlorine was passed through a tube 40 mm. in diameter and about 3.5 ft. long packed with sulfonated polystyrene type resin (Amberlite 1R120; Rohm and Haas) in spherical form (less than 20 mesh). The rate of flow was about 145–165 ml. per minute. By adding sodium oxalate to test portions of the effluent, calcium was detected after about 11 liters of solution had passed through the resin. The available chlorine content of a sample of the ninth liter through the column was 1.01%, substantially the same as charged to the column.

The column of resin was washed with water and then a 15% sodium chloride solution was passed down the column at a rate of about 50 cc. per minute until the effluent showed very little calcium by the oxalate test. Calculations show that the capacity of the resin for removing calcium would be that equivalent to 293 gallons of a 1% by weight calcium hypochlorite solution per cubic foot of resin.

*Example II*

A calcium hypochlorite solution containing 3% by weight of available chlorine was passed through a column of fresh resin of the type used in Example I and about 3.5 liters of effluent was obtained before a significant amount of calcium could be detected therein. The rate of flow through the column was about 50 ml. per minute.

*Example III*

Sodium zeolite (granular) may be substituted for the cation exchange resin used in Example I with substantially the same results. The mineral shows no loss of exchange ability due to hypochlorite activity. After several treatments with hypochlorite solutions, a sample of zeolite, on regenerating, showed an equilibrium capacity for calcium in a calcium chloride solution of about 1.91 gms. of calcium ion per 100 gms. of exchange material. The resin used in the preceding examples, after similar treatment with hypochlorites, showed a capacity for calcium of about 2.36 gms. of calcium ion per 100 gms. of resin.

We claim:

1. A process for continuous conversion of calcium hypochlorite in dilute aqueous solution into sodium hypochlorite in dilute aqueous solution which comprises passing a calcium hypochlorite solution containing less than about 5% by weight of available chlorine through a bed composed of a cation exchange material which is stable with respect to such a hypochlorite solution and which is charged with sodium ions until the material has become saturated with calcium ions, switching the flow of calcium hypochlorite to a fresh bed of a cation exchange material which is stable with respect to such a hypochlorite solution and which is charged with sodium ions, and in the meantime regenerating the first bed of material by washing with water and then a 15 percent by weight sodium chloride solution.

2. A process according to claim 1 in which the stable cation exchange material is an inorganic zeolite.

3. A process for continuous conversion of calcium hypochlorite in dilute aqueous solution into sodium hypochlorite in dilute aqueous soltuion which comprises passing a calcium hypochlorite solution containing less than about 5 percent by weight of available chlorine through a bed composed of a sulfonated polystyrene type cation exchange resin charged with sodium ions until the resin has become saturated with calcium ions, switching the flow of calcium hypochlorite to a fresh bed composed of a sulfonated polystyrene type cation exchange resin charged with sodium ions, and in the meantime regenerating the first bed of resin by washing with water and then a 15 percent by weight sodium chloride solution.

4. A process for continuous conversion of calcium hypochlorite in dilute aqueous solution into sodium hypochlorite in dilute aqueous solution which comprises passing a calcium hypochlorite solution containing less than about 5 percent by weight of available chlorine through a bed composed of a sulfonated aromatic hydrocarbon type cation exchange resin charged with sodium ions until the resin has become saturated with calcium ions, switching the flow of calcium hypochlorite to a fresh bed composed of a sulfonated aromatic hydrocarbon type cation exchange resin charged with sodium ions, and in the meantime regenerating the first bed of resin by washing with water and then a sodium chloride solution.

References Cited in the file of this patent

UNITED STATES PATENTS

| | | |
|---|---|---|
| 1,238,916 | Hoover | Sept. 4, 1917 |
| 1,481,003 | Gegenheimer | Jan. 15, 1924 |
| 1,947,248 | Burks | Feb. 13, 1934 |
| 2,198,874 | Holmes | Apr. 30, 1940 |
| 2,206,691 | Furness et al. | July 2, 1940 |
| 2,208,173 | Urbain et al. | July 16, 1940 |

FOREIGN PATENTS

| | | |
|---|---|---|
| 228,588 | Great Britain | Feb. 2, 1925 |
| 451,733 | Great Britain | Aug. 11, 1936 |

OTHER REFERENCES

"Organolites," by H. Burrell, page 358. Ind. and Eng. Chem., vol. 30, No. 3.

"Ion Exchange," pp. 123, 124. Chem. Eng., July 1947.

Kumin and Myers: "Ion Exchange Resins," 1950 ed., pages 25–27, John Wiley and Sons, Inc., N. Y.